July 5, 1955

T. W. CAHOW ET AL 2,712,276

TWO-WAY PLOW

Filed July 13, 1953

INVENTORS
THEODORE W. CAHOW &
RAYMOND W. WILSON
BY
*W. A. Schaich*
AND
*H. P. Settle, Jr.*
ATTORNEYS July 5, 1955    T. W. CAHOW ET AL    2,712,276
TWO-WAY PLOW
Filed July 13, 1953    5 Sheets-Sheet 4

INVENTORS
THEODORE W. CAHOW &
RAYMOND W. WILSON
BY
AND
ATTORNEYS

July 5, 1955   T. W. CAHOW ET AL   2,712,276
TWO-WAY PLOW
Filed July 13, 1953   5 Sheets-Sheet 5
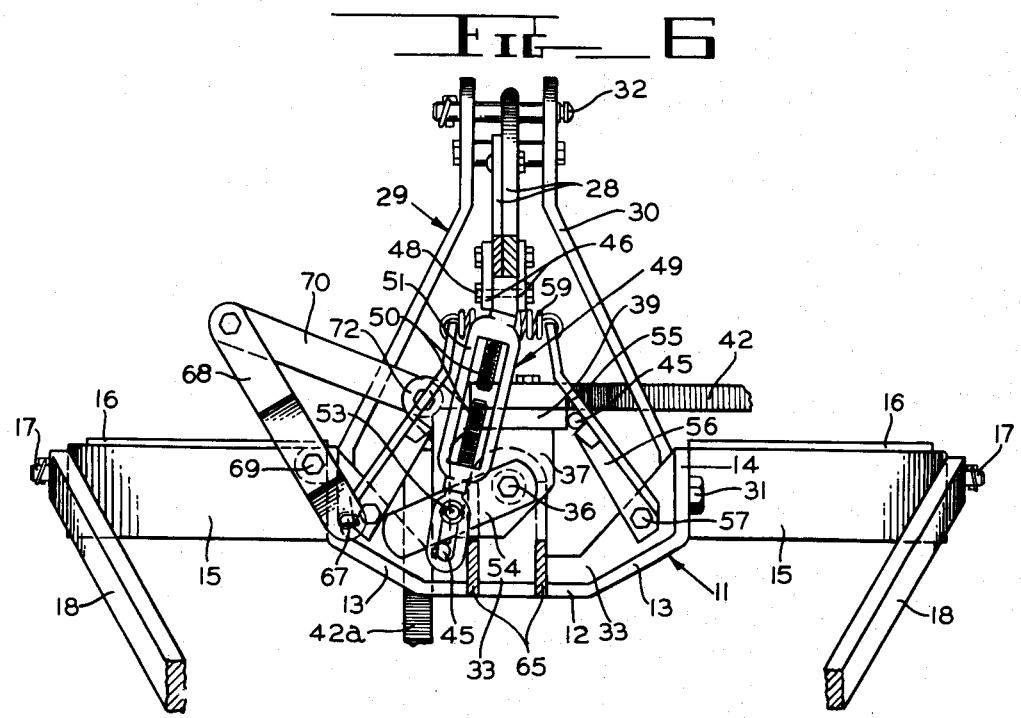
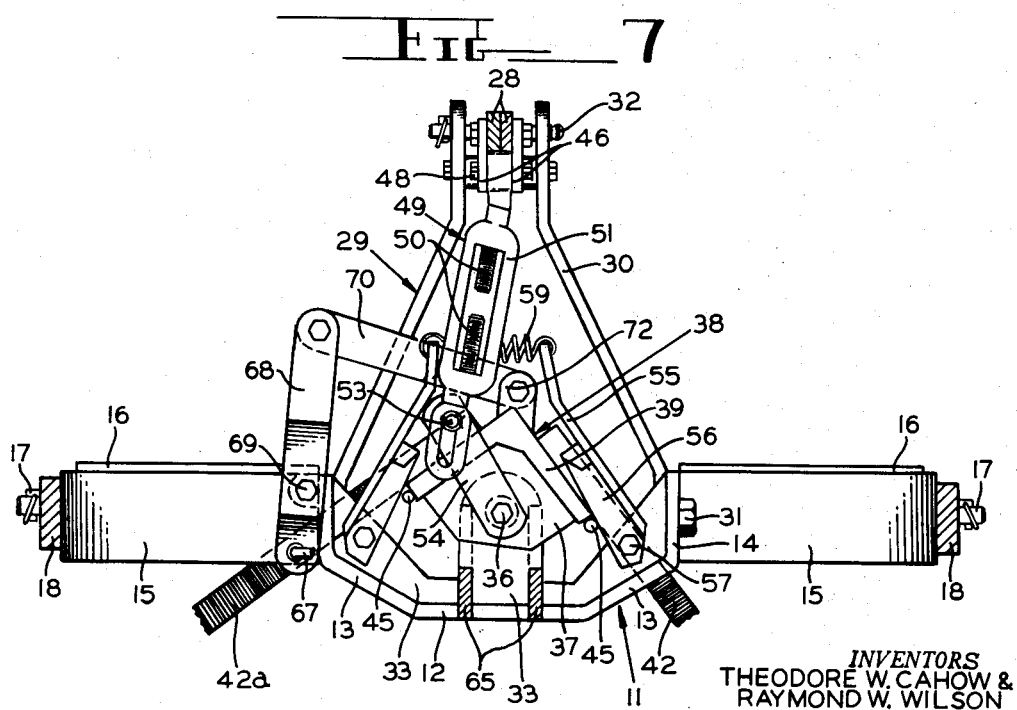
INVENTORS
THEODORE W. CAHOW &
RAYMOND W. WILSON
BY
AND
ATTORNEYS United States Patent Office 2,712,276
Patented July 5, 1955

2,712,276

TWO-WAY PLOW

Theodore W. Cahow, Birmingham, and Raymond W. Wilson, Ferndale, Mich., assignors, by mesne assignments, to Ford Motor Company, Dearborn, Mich., a corporation of Delaware Application July 13, 1953, Serial No. 367,518

3 Claims. (Cl. 97—26)

The present invention relates to a two-way plow and more particularly to such a plow wherein alternately usable plow bottoms are carried by an oscillatable beam structure which is indexed to render the bottoms selectively effective for a tillage operation.

Various types of two-way plows have been proposed in the prior art, and such plows are widely used in irrigated land, for hillside terracing operations, and elsewhere under conditions which require turning of the furrow slice in one direction even though the tractor traverses the field in opposite directions. It is, of course, necessary that the plow be actuated, preferably by some power means, to change the effective bottom at the end of each passage across the field in order that the furrow slice can be properly directed during the next passage. Many different types of actuating or indexing means have been proposed, but such devices are generally cumbersome, heavy, and expensive.

The present invention now proposes a novel type of indexing mechanism for actuating a two-way plow of the type having angularly disposed bases carried by an oscillatable beam structure. The plow, hereinafter described in detail, is particularly adapted for use with tractors having vertically spaced, forwardly and vertically convergent hitch links, one of which is power liftable, and which are adapted to carry implements at the trailing ends thereof for vertical movement with the links.

More particularly, the power for indexing the plow is derived from the differential movement of the links during lifting of the plow. Such differential movement results from the pivoting of the links about vertically spaced pivot centers located on the tractor.

The plow bottoms are indexed by a linkage actuated by such differential movement and effective to oscillate a main beam structure having angularly disposed surfaces to which are respectively connected the beams carrying the plow bottoms. The main beam structure carries a pair of indexing pins engaged by the actuating linkage to cause main beam oscillation, and the indexing pins are engagable with spring biased stop elements for preventing undesired oscillating movement when one of the bottoms is in working position. Means responsive to main beam oscillation are provided for variably positioning a single coulter, so that the coulter can be used effectively with each of the plow bottoms.

It is, therefore, an important object of the present invention to provide a simple and inexpensive two-way plow having alternately usable plow bottoms.

Another object is the provision of a two-way plow adapted for use with a tractor having vertically spaced power liftable hitch links, the plow having an indexing mechanism actuatable upon power lifting of the links.

It is a further object to provide a two-way plow having a main beam structure carrying separate, angularly disposed bases alternately usable upon oscillation of the plow beam about a longitudinal axis.

Yet another important object is the provision of a two-way plow in which power derived from power lifting of the links is utilized to oscillate a main beam structure about a longitudinal axis to render alternately effective a pair of angularly disposed plow bottoms carried by the beam.

It is an additional object of this invention to provide a two-way plow having an oscillatable main beam and means responsive to movement of the main beam to variably position a coulter for cooperation with a pair of alternately usable plow bases carried by the beam.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 6 is a sectional view similar to Figures 3 and 4 illustrating the plow in an elevated position at which the plow bottom indexing means is actuated; and Figure 7 is a view similar to Figure 6 in which the plow is partially raised and plow bottom actuation has been initiated.

As shown on the drawings:

Figure 1:
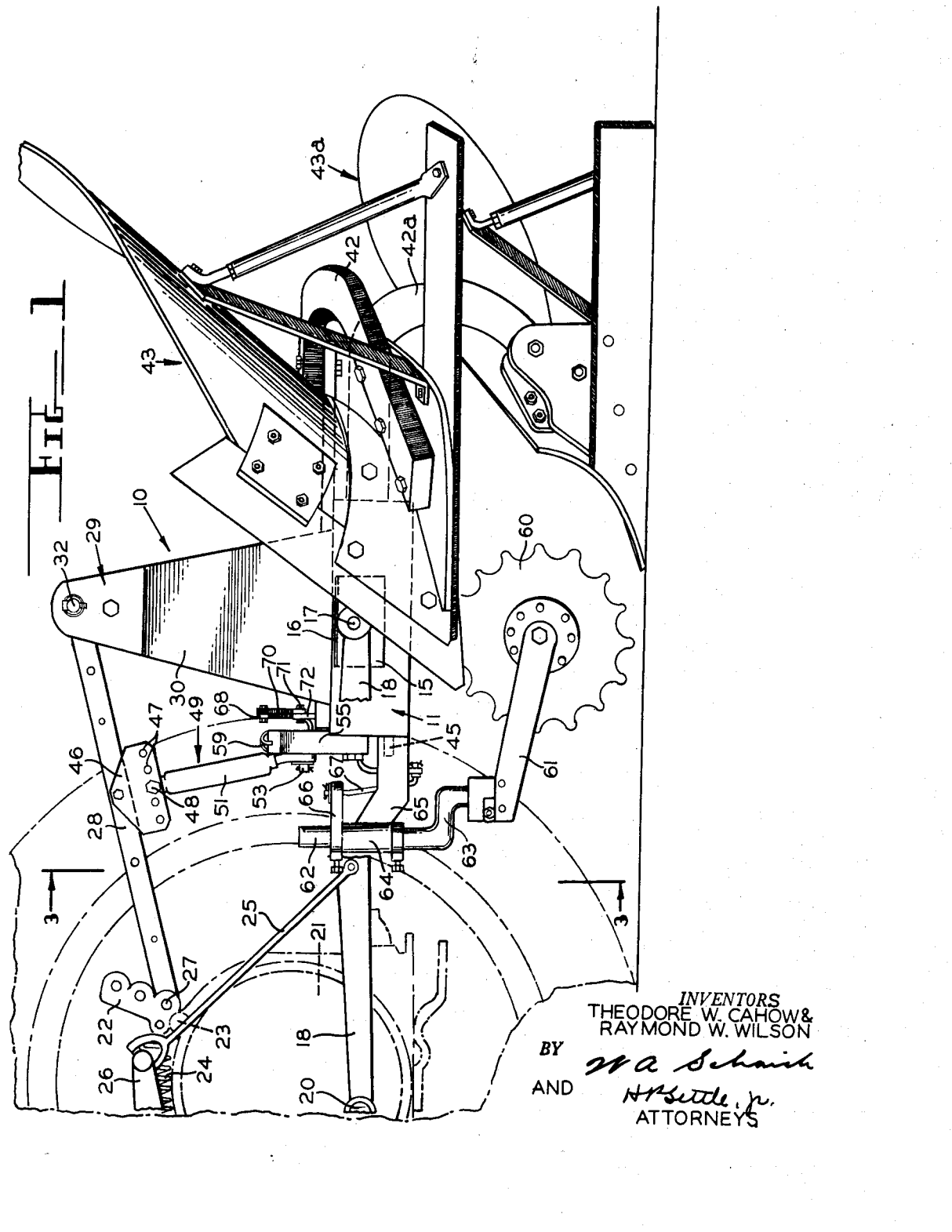
Figure 1 is a side elevational view of a plow of the present invention illustrated in connection with a pair of power liftable tractor-mounted draft links for elevating the plow and actuating the same.
Figure 2:
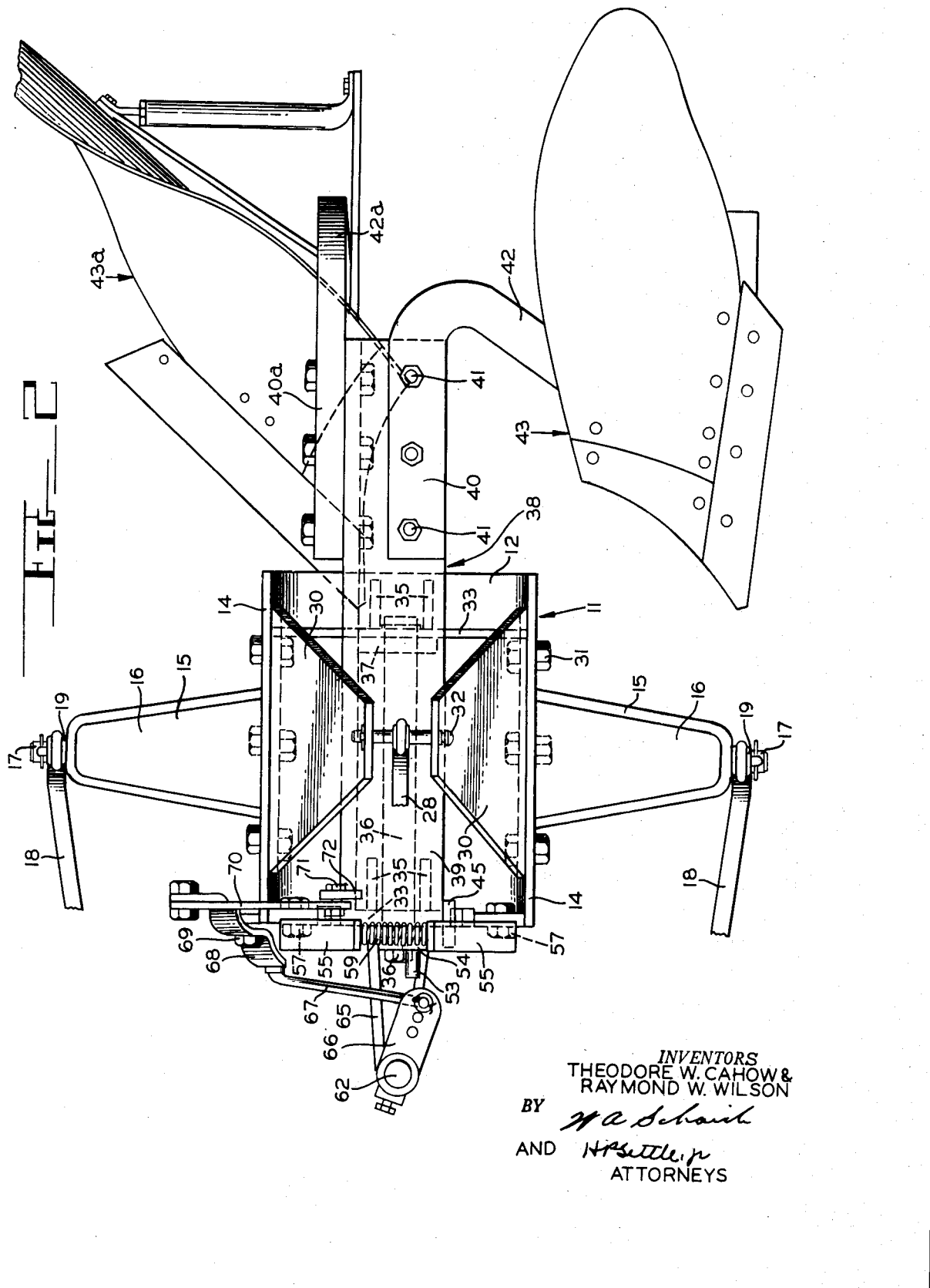
Figure 2 is a plan view of the plow of Figure 1.
Figure 3:
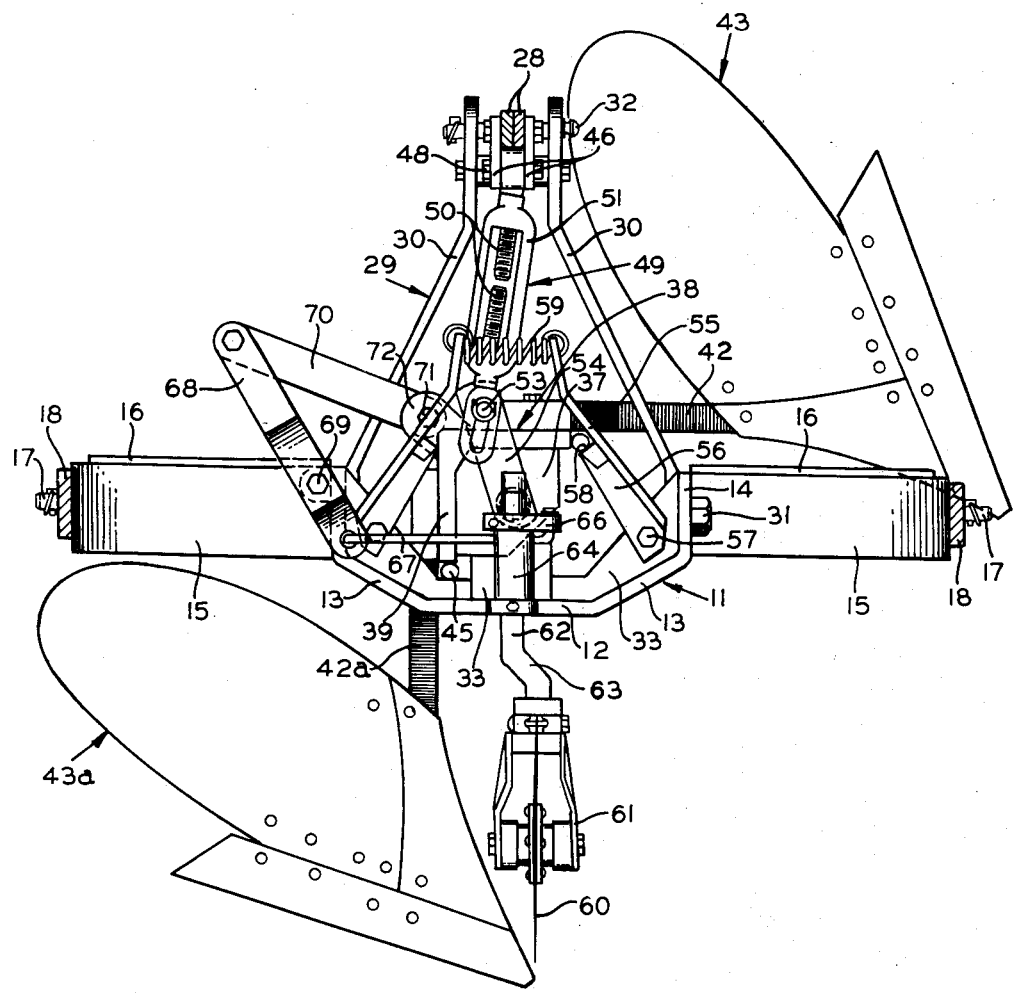
Figure 3 is a sectional view taken along the plane 3—3 of Figure 1.

In Figures 1–3, reference numeral 10 refers generally to a plow of the present invention. The plow 10 comprises a centrally located, transversely extending main yoke 11 having a flat bottom portion 12 joined by upwardly and outwardly divergent portions 13 to terminal upstanding outer portions 14.

The outer portions 14 are rigidly secured to opposed, laterally extended box sections 15 preferably formed of a single U-shaped strap having its inner ends welded or otherwise rigidly secured to the opposing terminal portions 14 of the yoke 11 and rigidified by a cover plate 16 generally overlying the box sections 15. The outer extremities of the box sections 15 carry laterally extending mounting pins 17 adapted to receive therein the free trailing ends of tractor-mounted draft links 18. The draft links are provided with segmental attachment bearings 19 as well known in the art and the forward ends of the links are universally pivotally connected, as at 20, to the rear axle housing 21 of a tractor.

The axle housing 21 is surmounted by a control arm 22 pivotally connected to the housing, as at 23, and adapted to react against the tractor hydraulic system control spring 24. Movement of the control spring 24 controls the vertical positioning of the draft links 18 which are pivotally connected to lift arms 25 power liftable by rock arms 26 carried by the tractor.

The control arm 22 is connected, at at 27, to a trailing tractor top link 28 connecting the tractor to an upstanding A-frame 29 mounted on the implement 10 and including a pair of upwardly convergent side plates 30 rigidly secured to the inner surfaces of the yoke terminal portions 14, as by bolt 31. An attachment pin 32 detachably secures the top link trailing end to the A-frame.

Figure 5:
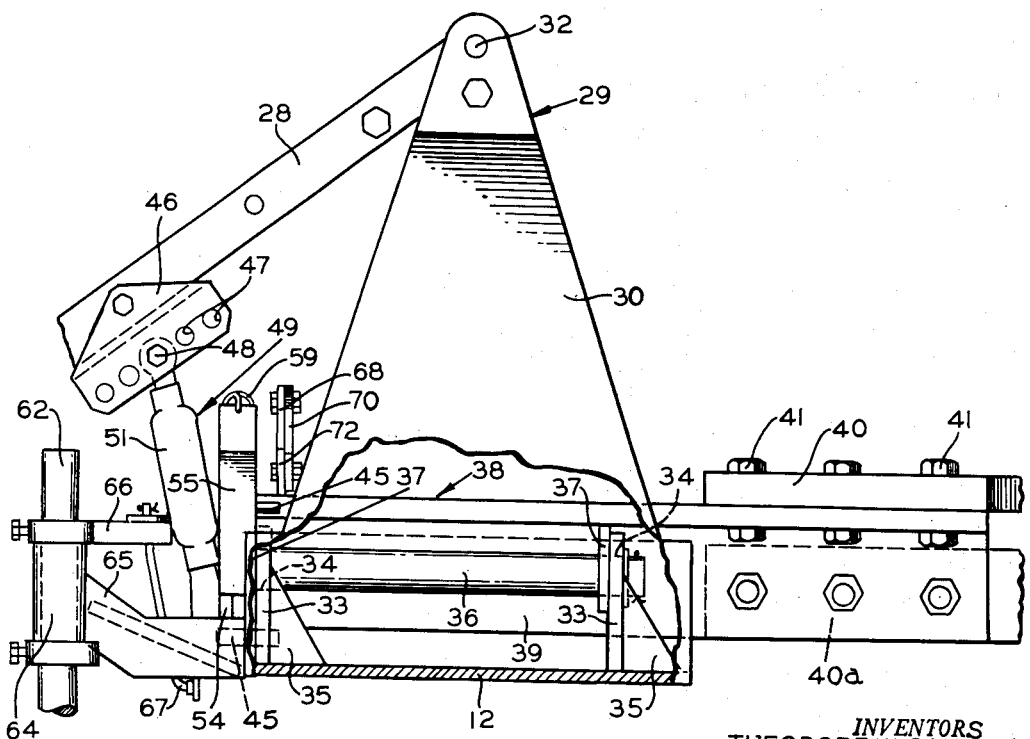
Figure 5 is a fragmentary side elevational view, with parts broken away and in section, similar to Figure 1 and illustrating the plow in an elevated position.

The yoke 11 carries a pair of upstanding ears 33 rigidly secured to the center portion 12 thereof, and these ears are provided with longitudinally aligned apertures 34 (Figure 5), the ears being reinforced by gusset plates 35. The aligned apertures 34 receive therethrough a main beam bearing pin 36 which is carried by a pair of longitudinally spaced ears 37, one of the ears 37 being positioned immediately adjacent and in flatwise contact with each of the ears 33. The ears 37 are rigidly secured to a main oscillating beam indicated generally at 38 and preferably taking the form of an angle iron having angularly disposed legs 39. It will be seen that the beam 38 is oscillatable about the pin 36 defining a longitudinal pivot axis rigid with the yoke 12.

To the legs 39 of the main beam 38, there are secured plow bottom beams 40 and 40a, respectively. The beams 40 and 40a are substantially identical and are secured to the main beam legs 39 rearwardly of the hitch frame by suitable means, as by bolts 41 traversing each beam and the associated beam leg 39. The plow bottom beams 40 and 40a extend rearwardly and downwardly, as at 42 and 42a, to carry at the lower ends thereof plow bottoms 43 and 43a, respectively. The bottoms 43 and 43a are of the conventional moldboard type, and it will be appreciated that the bottoms are alternately useable upon oscillation of the main beam 38 to either of its indexed positions about the longitudinal axis defined by the pin 36.

The indexing mechanism for oscillating the beam 38 includes a pair of indexing pins 45 (Figures 3 and 5), which are mounted upon the beam at the forward outer edges of the main beam legs 39. The pins are rigidly secured to the beam and are engaged by the indexing mechanism to be hereinafter described for oscillating the beam. Also, the pins are engaged by a later described stop mechanism for retaining the beam in either of its oscillated positions.

Figure 4:
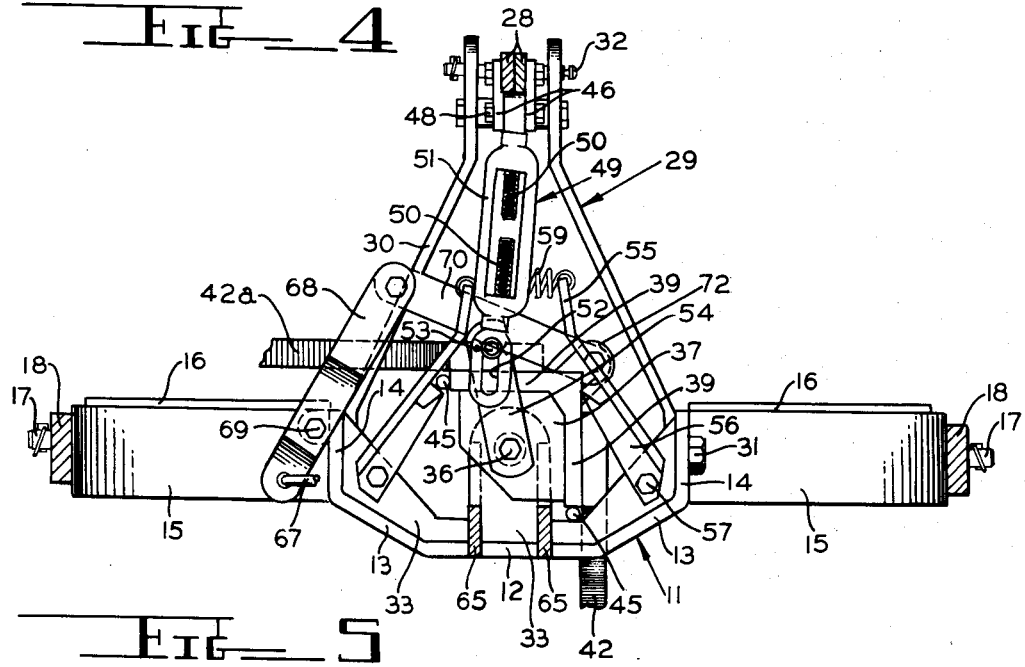
Figure 4 is a view similar to Figure 3 illustrating the plow in a relatively reversed position.

The indexing mechanism also includes a top link bracket rigidly secured to the top link thereof and including a pair of depending side plates 46 having a plurality of longitudinally spaced apertures 47 therein (Figure 1). The apertures 47 are adapted to receive a bolt 48 therethrough which carries an actuating link indicated generally at 49. The link 49 depends from the top link and is of variable length, the link being formed of a pair of turnbuckle bolts 50 threadedly received by a turnbuckle cage 51. The lower turnbuckle bolt 50 is provided with a lower terminal vertical slot 52 slidably receiving therein a forwardly projecting pin 53 fixedly secured to a beam oscillating link 54, which link is pivotally connected to the extreme forward end of the bearing 36 (Figure 4).

From an inspection of Figures 4 through 7, it will be appreciated that power elevation of the lower links 18 will effect lifting of the plow 10. Since the links 18 and the top link 28 are pivotally connected to the tractor on vertically spaced axes and the top link and lower links are vertically convergent, the top link will be relatively closer to the lower links when the plow is in its raised position (Figure 5) than when in its lower position (Figure 1). Thus, relative vertical movement occurs between the lower links 18 and the top link 28. This relative vertical movement is utilized to actuate the indexing mechanism of the present invention, since such vertical movement will cause the relative lowering of the actuating link 49 to cause pivoting movement of the beam oscillating link 54 about its pivot center which is defined by the bearing 36. It will be noted that the combined length of the actuating link 51 and the oscillating link 54 is greater than the distance between the top link 28 and the bearing 36 even when the plow is in its lowermost position. Accordingly, the pivot centers defined by the two links and their pivot points 48, 53 and 36 are not vertically aligned, and the links must be over-centered to one side or the other of a vertical plane. In other words, the pivot point defined by the pin 53 is not aligned with the plane joining the respective other ends of the links 51 and 54.

It will be noted from Figure 2 that the indexing pins 45 lie in the path of travel of the oscillating link 54 as this link 54 is rotated about its pivot center 36, as upon elevation of the plow. Continued plow elevation will cause pivotal movement of the pin 45 about the pivot center defined by the bearing 36 because of the force exerted on the pin by the oscillated link 54 and the actuating link 51. Accordingly, movement of the oscillating link will cause oscillation of the main beam 38 about the bearing 36.

To retain the beam in either of its operated positions, a stop mechanism is provided. This stop mechanism includes a pair of upwardly convergent stop arms 55 having integrally formed stop plates 56 which are pivoted to the main yoke 11 on bolts 57. The stop plates terminate in free upper edges 58 (Figure 3) which face inwardly and upwardly to underlie the indexing pin 45 of the main beam leg 39 which carries the plow bottom which is inactive at that time. The stop arms project above the main beam and are joined by a laterally extending tension spring 59 which serves to draw the arms toward one another.

When the plow is raised, Figure 4, initial movement of the actuating link 49 causes arcuate sideward movement of the oscillating link 54, and the link 54 contacts the inner side of the adjacent stop arms 55. Further elevating movement of the plow effects further arcuate movement of the link 54 to force the stop arm laterally outwardly to such an extent that the upper indexing pin 45 is removed from its abutment with the stop surface 58 of the associated stop plate 56. The freeing of the pin 45 will allow the beam to rotate about the pin 36 until the weight of the bottoms causes the beam to reach a central position as shown in Figure 7. Next, the oscillating link 54 is depressed by the actuating link 51 until it contacts the indexing pin and forcibly depresses the indexing pin until the position illustrated in Figure 6 is assumed. At this time, the spring 59, which has been tensioned by forcing of the stop plate outwardly to release the upper pin 45, draws the stop plates toward one another and the opposite pin 45 abuts the opposite stop surface 58 of the other stop plate 56. Thus, the beam has been oscillated to reverse the relative positions of the plow bottoms 43 and 43a and the upper bottom is retained in raised position by the positioning of its indexing pin behind the corresponding stop surface 58.

Upon next lowering the plow, the free end of the link 54 will, of course, contact the first mentioned stop arm to force the same laterally outwardly. However, this movement of the stop arm does not release the main beam 38 for oscillation since the main beam is retained by the other stop pin 45 and the other stop arm 55.

In case an obstruction is encountered during operation of the plow when in the position of Figure 3, for example, after the beam has been oscillated to the position of Figure 3 from the position of Figure 4, the beam will not be again oscillated. This operation to retain the same bottom in ground-engagement is greatly desired under practical operating conditions. As will be seen from Figure 3, the links 49 and 54 are over-centered in the same position as was assumed following the indexing of the beam to lower the bottom 43. Upon elevation of the plow, the oscillating link 54 will again be depressed toward the left. Thus, the right-hand indexing pin 45 will remain seated behind the adjacent stop surface 58, and the indexing pin 45 will not be moved. To lower the other bottom 43, following the lowering of the bottom 43a it is only necessary for the operator to manually over-center the links 49 and 54 toward the raised indexing pin 45 and toward the raised plow bottom 43.

To insure accurate plowing it is desired to utilize a coulter in advance of the active plow bottoms 43 or 43a. The present invention provides a coulter indexing mechanism which makes possible use of a single coulter serving the two bottoms, even though the plow share points of the bottoms 43 and 43a are not exactly vertically aligned when in their respective lowered positions.

The coulter structure includes a coulter plate 60 carried by a coulter yoke 61 mounted upon an upstanding coulter stem 62 having a medial crank portion 63. The upper end of the coulter stem is journaled in a vertically extended coulter collar 64 carried by the main yoke 11 by a pair of forwardly projecting, laterally spaced coulter collar arms 65. The coulter stem carries a generally rearwardly projecting coulter arm 66 (Figure 2) which is rotatable with the coulter stem and which is joined to a laterally extending coulter actuating arm 67. The arm 67 is pivotally connected to a second generally vertically extending lever arm 68 which is medially pivoted to the main yoke 11, as by pivot bolt 69. The lever arm 68 is pivotally connected in its upper end to a laterally extending coulter link 70 which in turn is pivotally connected by bolts 71 to an upstanding ear 72 mounted upon the main oscillatable beam 38. Upon oscillation of the beam, the coulter link 70 is reciprocated laterally and the resulting pivoting movement is imparted to the coulter stem through the lever arm 67 and the coulter arm 66. Upon pivoting the coulter stem, the crank portion 64 thereof causes lateral movement of the coulter blade into substantial longitudinal alignment with the share point of the then active plow bottom 43 or 43a.

From the foregoing description it will be appreciated that the present invention provides a new and novel two-way plow construction which is of simple and inexpensive construction. The plow bottom beams are carried by an oscillating beam formed of a length of angle iron which is oscillatable about the centrally located longitudinal axis. The means for oscillating the beam is extremely simple and derives its power from the power lifting of the plow by the tractor draft links. The indexing mechanism is semi-automatic in operation, so that the plow may be lifted upon striking an obstruction without effecting oscillation of the main beam and a reversal of the plow bottoms. Also, the present invention provides a novel coulter indexing structure whereby single coulter may be utilized in connection with a plurality of alternately usable plow bottoms.

It will, of course, be understood that various details of construction may be varied through a wide range without departing from the principles of this invention and it is, therefore, not the purpose to limit the patent hereon otherwise than necessitated by the scope of the appended claims.

We claim:

1. For use with a tractor having trailing vertically forwardly convergent, power liftable upper and lower hitch links pivoted to the tractor for vertical movement about vertically spaced axes, a two-way plow comprising a plow frame attachable to the trailing ends of said hitch links for vertical movement therewith, a main beam having angularly disposed legs and pivotally carried by said frame, forward portions of said legs underlying said top link and adapted for oscillating movement about a longitudinal axis, said beam legs respectively having transversely spaced projections thereon, oppositely directed plow bottoms carried by said beam legs respectively for oscillating movement therewith, movement of said beam selectively rendering said bottoms effective for a tilling operation, upper and lower actuating links respectively pivotally joined to and interposed between said upper hitch link and said beam axis, said actuating links being pivotally interconnected, a pair of pivotal stop levers respectively projecting upwardly alongside the respective legs of said beam, resilient means urging said levers toward said beam, each of said levers engaging a corresponding projection on the adjacent beam leg, vertical lifting of said hitch links effecting relative movement of said actuating links to move said lower actuating link about said axis, said lower link being so disposed that pivotal movement thereof will effect sequential engagement of the same first with one lever to remove said lever from engagement with said corresponding projection, and then with said corresponding projection to actuate said beam for oscillatory movement about said axis.

2. For use with a tractor having trailing, vertically forwardly convergent, power liftable upper and lower hitch links pivoted to the tractor for vertical movement about vertically spaced axes, a two-way plow comprising a plow frame attachable to the trailing ends of said hitch links for vertical movement therewith, means on said frame defining a longitudinal pivot axis, a main beam pivotally carried by said frame for oscillating movement about said longitudinal axis, said beam having transversely spaced projections thereon, upper and lower actuating links having pivotally interconnected portions, the lower actuating link having one end thereof pivotally connected to said axis means and having a medial portion pivotally connected to the free lower end of said upper link, means for connecting the free end of the upper of said actuating links to said upper hitch link, the other end of said lower actuating link being movable in an arcuate path about said axis and encompassing said beam projections, a pair of stop levers respectively pivotally joined to said frame and projecting upwardly alongside opposite sides of said beam, resilient means urging said levers toward said beam, each of said levers engaging a corresponding projection on said beam, vertical lifting of said hitch links lessening the vertical distance therebetween to effect relative movement of said actuating links, with said lower actuating link being moved about said axis, said lower link being so disposed that pivotal movement thereof will effect initial engagement of said lower link with one lever to remove the same against the bias of said resilient means from engagement with said corresponding projection, and subsequent movement of said lower actuating link causing said link to contact said corresponding projection to actuate said beam for oscillatory movement.

3. For use with a tractor having trailing vertically convergent power liftable upper and lower hitch links pivoted to the tractor for vertical movement about vertically spaced axes, a two-way plow comprising a plow frame attachable to the trailing ends of said hitch links for vertical movement therewith, a main beam pivotally carried by said frame for oscillating movement about an axis, said beam having spaced projections thereon, oppositely directed plow bottoms carried by said beam for oscillating movement therewith, movement of said beam selectively rendering said bottoms effective for a tilling operation, pivotally interconnected upper and lower actuating links, one of said actuating links being freely pivotal about said axis, means for connecting the free end of the other of said actuating links to said upper hitch link, a pair of stop levers respectively pivotally joined to said frame and projecting upwardly alongside opposite sides of said beam, means urging said levers toward said beam with each of said levers engaging a corresponding beam projection, vertical lifting of said hitch links effecting relative movement of said actuating links to move said one actuating link about said axis, said one link being so disposed that initial movement thereof about said axis will effect engagement of said link with one lever to remove said lever from engagement with said corresponding projection, and subsequent continued movement of said one link will effect engagement of said one link with said corresponding projection to actuate said beam for oscillatory movement.

References Cited in the file of this patent
UNITED STATES PATENTS

| | | |
|---|---|---|
| 1,243,072 | Juran | Oct. 16, 1917 |
| 2,543,786 | Lindeman | Mar. 6, 1951 |
| 2,608,147 | Ezzell | Aug. 26, 1952 |
| 2,633,788 | Nelson | Apr. 7, 1953 |

FOREIGN PATENTS

| | | |
|---|---|---|
| 948,155 | France | Jan. 24, 1949 |